(No Model.) 2 Sheets—Sheet 1.
J. H. SHIREMAN.
ORANGE, FRUIT, OR VEGETABLE SIZER.
No. 532,597. Patented Jan. 15, 1895.
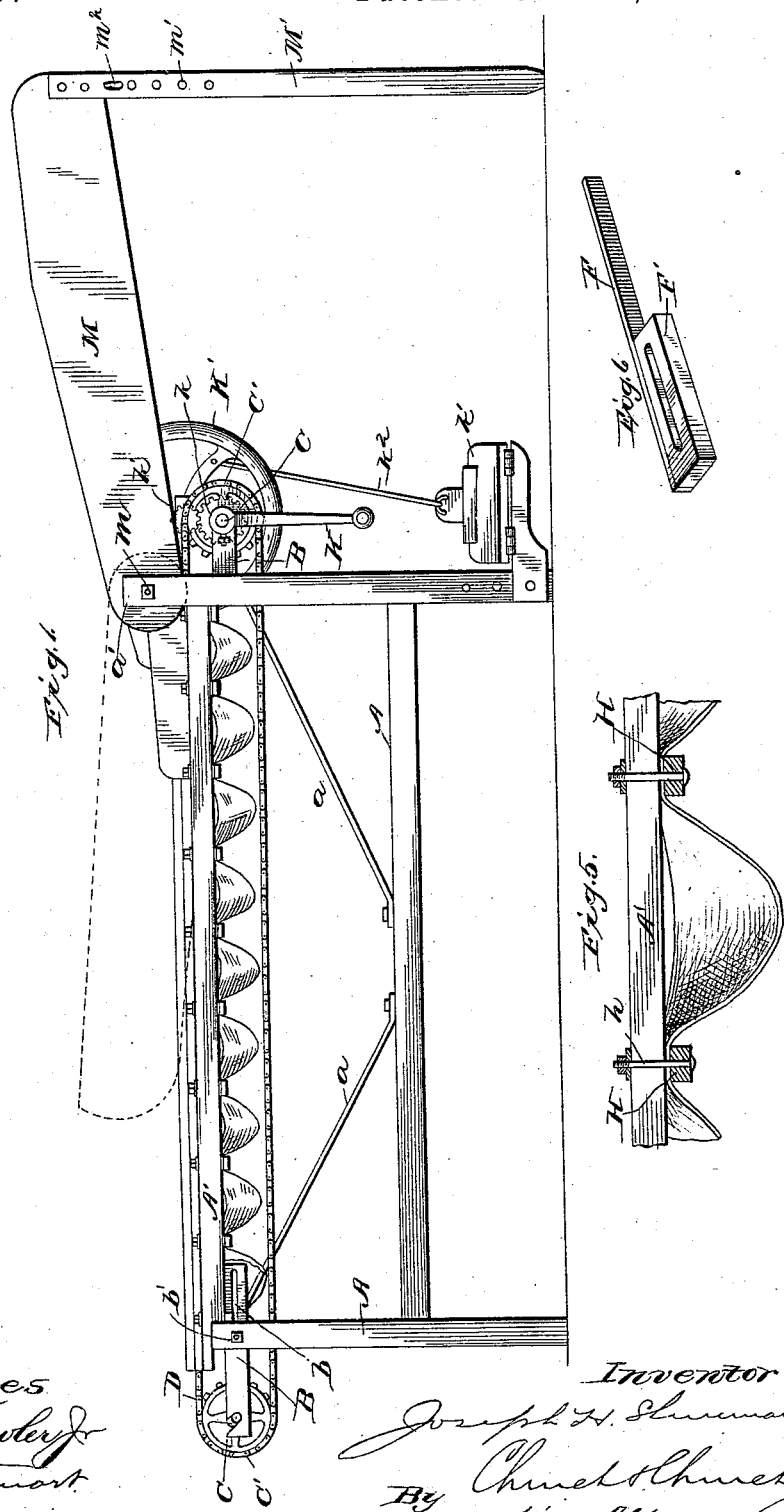

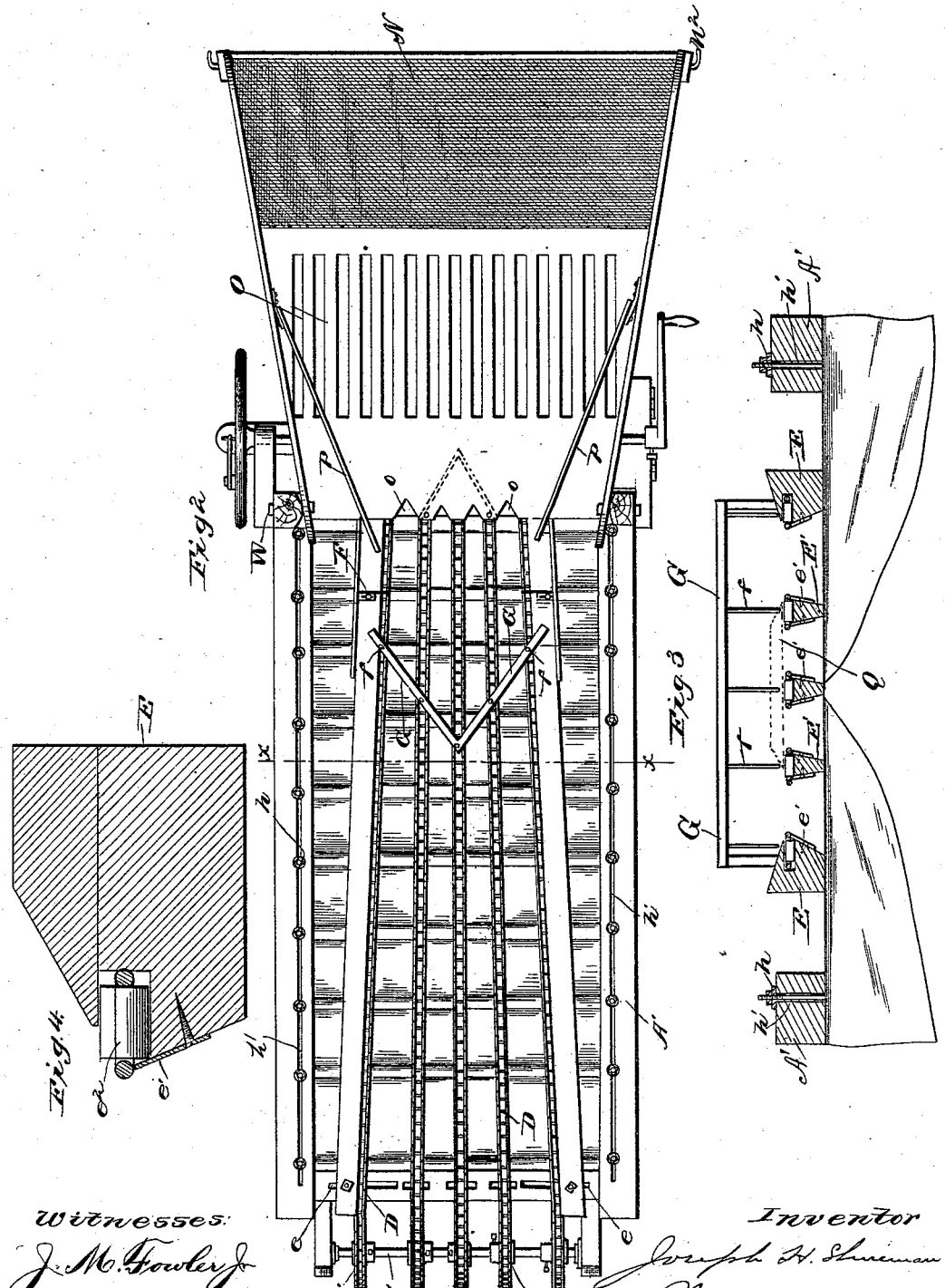

UNITED STATES PATENT OFFICE.

JOSEPH H. SHIREMAN, OF YORK, PENNSYLVANIA.

ORANGE, FRUIT, OR VEGETABLE SIZER.

SPECIFICATION forming part of Letters Patent No. 532,597, dated January 15, 1895.

Application filed December 31, 1892. Serial No. 456,890. (No model.)

*To all whom it may concern:*

Be it known that I, JOSEPH H. SHIREMAN, of York, in the county of York and State of Pennsylvania, have invented certain new and useful Improvements in Orange, Fruit, or Vegetable Sizers; and I do hereby declare the following to be a full, clear, and exact description of the same, reference being had to the accompanying drawings, forming a part of this specification, and to the letters of reference marked thereon.

This invention relates to improvements in machines for sorting by size, any of the ordinary fruits or vegetables, such as oranges, mandarins, tangerines, lemons, potatoes, plums, peaches, &c., the object of the invention being to provide a machine for accomplishing this result which shall be simple in design, and capable of perfect adjustment, for operating upon fruit and vegetables such as just mentioned, a further object being to sort the fruit or vegetables without abrading or injuring the same in the least, no matter how delicate the skin may be. To accomplish this result, the machine may be said to carry the fruit or vegetables until deposited at the proper place, as contradistinguished from machines of this character heretofore employed in which the fruit or vegetable is rolled or moved in frictional contact with its supporting surface or body.

Broadly stated, the invention may be said to consist in a machine having a carrier or system of carriers adapted to convey the fruit to points determined by the size of the same, at which points the fruit is discharged from the carrier and deposited in appropriate receptacles for boxing or being otherwise disposed of.

More specifically the invention consists in a machine having a carrier or system of carriers formed by diverging conveyers traveling from the narrower toward the wider end whereby the fruit resting thereon is conveyed to a point where the divergence of the carriers makes the space between them sufficiently great to allow the fruit to pass between them.

Finally the invention consists in a machine of the character just mentioned having a converging hopper for directing the fruit and vegetables upon the narrow end of the conveyer together with certain novel details of construction and combinations and arrangements of parts all as will now be described and pointed out in the appended claims.

Referring to the accompanying drawings: Figure 1 is a side elevation of a machine embodying my present invention. Fig. 2 is a top plan view of the same in its most approved form. Fig. 3 is a transverse section on the line $x-x$, Fig. 2. Fig. 4 is an enlarged section of one side of one of the carriers with its supporting rail or guide way. Fig. 5 is a detail of one of the receiving pockets. Fig. 6 is a detail perspective of one of the straighteners.

Similar letters of reference in the several figures indicate the same parts.

In the machine shown in the drawings, the letter A indicates the main frame made of any approved form, preferably, however, of light construction with suitable diagonal braces $a$ for strength, and upward extensions $a'$ on the legs at one end. At each end of the frame A, are supported hangers B, which may be made adjustable as by a slot $b$ and bolt $b'$, and in these hangers are mounted transverse shafts C adapted to support wheels C' which form the primary supporting and driving mechanism for the carriers D. As shown in the drawings these carriers are formed by sprocket chains and the wheels C' are sprocket wheels, but it is obvious that any other flexible carriers or carrying belts may be employed, the object being simply to form moving supports for the fruit, which supports may be run at an angle to each other and thereby form a diverging space between them to permit the passage of fruit of different size at different points in the length of the carrier.

The number of carrying belts and their relative distance apart is of course to be controlled by the desired capacity of the machine and the size of the fruit or vegetable to be operated upon, as for instance, where oranges are to be sorted, the belts must be separated quite a distance and where plums are to be sorted, they should be quite close together, and to enable one machine to be adjusted to sort any of the ordinary fruits and vegetables the wheels C' are made adjustable on the shaft C. Thus the belts may be shifted toward and from each other or their divergence increased or diminished as desired for operating upon fruits or vegetables of different kinds.

With what I term a single run machine two belts are necessary forming a single conveyer. In practice however, it has been found expedient to employ a double run machine or one having four belts, and I prefer to make the machine as shown in the drawings with four runs, in which instance, but five belts are found necessary as the center belts may perform a double function that is to say one side forms a carrier for one run and the other side a carrier for the adjacent run, the belts being preferably wide enough to prevent the fruits or vegetables interfering with each other in the adjacent runs.

As before stated, the belts or carriers are preferably formed by chains, of any ordinary construction preferably, however, having straight side pieces constituting substantially continuous smooth bearing surfaces upon which the fruit may rest, and between the carrying wheels at each end of the machine, the belts are supported and guided in direct lines by stringers, tracks or supports E E', the tracks or supports E forming the guide ways for the outer belts being adjustably mounted on the frame as shown for instance at $e$, and have their upper surfaces extended above the belts a short distance to prevent the lateral escape of the articles being separated. The tracks or supports E' for the inner belts on the other hand are preferably somewhat narrower than said belts and lie immediately beneath the center. In both instances, however, the tracks or supports E E' are provided with upwardly projecting flanges or guide strips $e'$ $e'$ projecting up on each side of the bosses or enlargement $e^2$ (Fig. 4) on the belt and constituting the bearing in which the reduced end of the adjacent link plays, thus effectually preventing any inward movement of the outside belts and any lateral movement of the inner belts as will be readily understood from an inspection of Fig. 3. The supports E E' are also preferably cut away toward the bottom forming diverging openings to prevent all possibility of the fruit becoming caught after having passed through between the belts.

The machine thus far described, is adapted for separating oranges or other smooth regular fruit but when it is desired to separate irregularly shaped fruit or vegetables, such as lemons or potatoes, it is necessary to provide some means for straightening the same upon the conveyers, as practice has demonstrated that it is desirable to separate such fruit and vegetables in accordance with their shortest diameters. To accomplish this, I preferably employ straighteners projecting in proximity to the belts in such manner that any article traveling along on the belt will be struck thereby and as the belt moves forward carrying the body of the article, such as a lemon, it will be turned longitudinally of the conveyer.

In the preferred form, I employ flexible straighteners or fingers such as F secured in any preferred manner as by slotted base piece F', Fig. 6, to the side rails or supports for the belts. To operate on the articles being carried by the inner conveyers or belts the straighteners are mounted on a bridge G, Figs. 2 and 3. In Fig. 2 this bridge is shown as supporting straighteners $f$ supplemental or in addition to the straighteners F, which straighteners $f$ and the bridge are diagonally arranged, or in other words in different transverse planes in order that the article being carried by the conveyer could not by any possibility be in engagement with two straighteners at the same instant and be thereby arrested in its forward movement. Beneath the conveyers are arranged a series of pockets I for receiving the articles as they pass through between the belts, to convey the same away and into suitable boxes or receptacles, which pockets or chutes I preferably construct of fabric such as canvas to prevent bruising or injury. The pockets or chutes are formed by supporting the canvas at suitable intervals upon cross pieces H adjustably connected to the side pieces A' of the main frame by bolts $h$ passing through a longitudinal slot $h'$. This construction permits the size of the pockets or chutes to be varied at pleasure, or the number to be increased or decreased at will, thereby securing the desired assortment of the fruit or vegetable or enabling the operator to gage to a nicety the quantity of fruit that shall be deposited in the respective receptacles, for instance where it is desired to fill boxes just full enough to allow of the putting on of the covers sufficiently tight to prevent injury to the fruit during transportation. The machine is thus made adjustable to fill any size boxes with exactly the size of fruit necessary to pack tight.

The belts or conveyers may be driven in any suitable manner but I prefer to provide both a hand and foot power mechanism by securing a crank handle K to the shaft C at the inner end of the machine and providing said shaft with a gear wheel $k$ meshing with a pinion $k'$ journaled in the frame and carrying a fly wheel K' to which latter the connecting rod $k^2$ for the foot treadle $k^3$ is attached, all as shown clearly in Fig. 1. At this end of the machine, I also provide a hopper M of relatively large dimensions, that is to say, the rear end is wide while the forward end converges to approximately the width of the narrower ends of the conveyers. The width of the rear end of the hopper is preferably made sufficient to permit wide boxes of fruit and vegetables to be dumped directly therein and to prevent injury to the fruit or vegetables, the bottom of the hopper at the rear end is formed by a sheet of canvas or other flexible fabric N securely attached at the edges by tacks or otherwise, and in front or at a lower point in the hopper, the bottom of the hopper is formed by a grating O which permits the sand, dirt, &c., on the fruit to drop through before the fruit reaches the conveyers and this effect is further increased and the fruit arranged to a certain degree by the slots or notches $o$ formed in the lower edge of the hopper with a clear space beneath them through which dirt, &c., may drop. The hopper itself is pivotally connected to the upwardly extending posts $a'$ by means of bolts $m$ so as to be readily folded over to the position shown in dotted lines, Fig. 1, for storage or transportation. At the rear end removable legs $M'$ are provided having a series of holes $m'$ for co-operation with projections $m^2$ on the hopper whereby the height of the rear end of the hopper and its consequent inclination may be varied to suit the kind of fruit or vegetable being separated.

When the narrow ends of the conveyers do not fill the space between the sides of the hopper M, supplemental hinged side pieces P are employed, the lower ends of which may be adjusted to direct the fruit into any one or more of the conveyers, a function which is particularly useful where different grades of fruit are to be sorted, for instance, bright and rusty oranges, as in such cases one of the adjustable side pieces may be moved to the position shown in dotted lines Fig. 2, and the operator standing beside the machine picks the rusty or bright oranges up as they roll down the hopper and places them on the inner side of the adjustable side, from whence they drop down upon the conveyers and are separated as before described.

In Fig. 2, for convenience I have illustrated two outside conveyers adjusted for operating upon oranges or relatively large fruit and the inside conveyers as adjusted for operating upon smaller fruit, plums or peaches, for instance, and when the inside runs are not being utilized a stationary gate E, $E^5$, shown in dotted lines, Fig. 2, may be employed to direct the fruit to the outside runs, and in addition I preferably employ a removable guide piece Q, as shown in dotted lines, Fig. 3, which covering both the inside runs prevents the lateral escape of the fruit from the outer runs. This removable guide piece has its edges inclined similar to the top of the side supports E so as to entirely escape contact with the fruit when resting squarely on the conveyers, but at the same time will catch and prevent the fruit from rolling off the conveyers should they be inclined to do so from any cause.

It is obvious, that all of the runs may be adjusted for simultaneous operation upon any of the ordinary fruits or vegetables, but the construction just described is convenient in that the machine is thereby adapted for use upon practically any of the ordinary fruits or vegetables without special adjustment by the operator. The bridge G is of course removable and if desired any ordinary power mechanism may be employed to run the machine.

It will be seen from the foregoing description that with a machine constructed in accordance with this invention the fruit having been dumped in the hopper, descends by gravity upon the conveyers and is carried forward by the said conveyers without being bruised or mutilated in the slightest degree and that irrespective of the particular shape or size of the fruit or vegetable and when it has reached a point where the space between the conveyers is sufficiently great it drops through into the appropriate pocket or chute, and while I have described specifically the chains or belts as constituting the conveyers it is obvious that other moving bodies may be employed with their carrying surfaces diverging from each other to accomplish the same result, and hence I do not wish to be limited in this respect as the invention consists broadly in the use of diverging conveyers of any character upon which the fruit is deposited at the narrower end and allowed to pass through between the conveyers when the space is sufficiently great, whereby fruit or vegetables of different size are dropped by the conveyers at different points.

Having thus described my invention, what I claim as new is—

1. In a fruit and vegetable sizer, the combination with the diverging traveling conveyers, of the converging hopper for feeding fruit, &c., to the narrower end of the conveyers; substantially as described.

2. In a fruit and vegetable sizer, the combination with the frame and sorting conveyers, of the hopper pivotally connected to one end of the frame, whereby it may be folded over the conveyers; substantially as described.

3. In a fruit and vegetable sizer, the combination with the frame and conveyers, of the converging hopper pivotally connected at the smaller end to the frame above the conveyers substantially as described.

4. In a fruit and vegetable sizer, the combination with the laterally adjustable conveyer for separating fruit of different kinds, of a hopper having laterally adjustable side pieces; substantially as described.

5. In a fruit and vegetable sizer, the combination with the diverging endless traveling conveyers, of the side pieces projecting above the level of the conveyers to prevent the lateral escape of the fruit or vegetables being sized; substantially as described.

6. In a fruit and vegetable sizer, the combination with the diverging endless traveling conveyers, of the side pieces having tracks for the conveyers and top sections on said side pieces projecting above the level of the conveyers to prevent the lateral escape of the fruit being sized; substantially as described.

7. In a fruit and vegetable sizer, the combination with the diverging endless traveling conveyers, of the stringers or supports for the belts having upward extensions $e'$ between the belts for preventing lateral movement of the conveyers toward each other; substantially as described.

8. In a fruit and vegetable sizer, endless diverging conveyers formed of chains having substantially straight side bars whereby smooth straight surfaces are provided for the fruit to rest on; substantially as described.

9. In a fruit and vegetable sizer, the combination with the endless chains forming the conveyers, of the supports for the chains having flanges cooperating with the enlargements or bosses forming the bearings between the links to prevent lateral movement of the chains; substantially as described.

10. In a fruit and vegetable sizer, the combination with the frame and separators, of the chutes or pockets beneath the separators formed of fabric and the cross pieces supporting said fabric adjustably connected to the frame whereby the size of the pockets or chutes may be varied.

11. In a fruit and vegetable sizer, the combination with the frame having the slotted side pieces and the separators, of the fabric chutes or pockets beneath the separators, the cross pieces supporting the pockets or chutes and bolts carrying said cross pieces passing through the slotted side pieces of the frame, whereby the size of the pockets may be varied; substantially as described.

12. In a fruit and vegetable sizer, the combination with the separated traveling conveyers, of the straighteners projecting in proximity to said conveyers and at one side of the trough between the conveyers, whereby the articles are arranged with their longest axis longitudinally of the conveyers; substantially as described.

13. In a fruit and vegetable sizer, the combination with the separated traveling conveyers, of the adjustable straighteners mounted on each side of said conveyers and projecting in proximity thereto, whereby irregular shaped articles are arranged with their longest axis longitudinally of the conveyers; substantially as described.

14. In a fruit and vegetable sizer, the combination with the traveling conveyers, of the resilient straighteners projecting in proximity to the said conveyers whereby irregular shaped articles are arranged with their longest axis longitudinally of the conveyers; substantially as described.

15. In a fruit and vegetable sizer, the combination with the separated traveling conveyers, of the straighteners projecting in proximity to the conveyers and adjacent straighteners arranged in different transverse planes whereby the fruit is prevented from lodging; substantially as described.

16. In a fruit and vegetable sizer, the combination with the series of traveling conveyers, of the diagonally arranged bridge above the conveyers and the series of straighteners depending from said bridge whereby they are located in different transverse planes; substantially as described.

17. In a fruit and vegetable sizer, the combination with the separating mechanism consisting of separated conveyers of the hopper leading thereto having the lower edge notched opposite the opening between the separated conveyers to guide the fruit to the separating mechanism; substantially as described.

18. In a fruit and vegetable sizer, the combination with the conveyers and series of pockets beneath the same, of the hopper having the lower edge notched forming open spaces in advance of the pockets for the escape of dirt; substantially as described.

19. In a fruit and vegetable sizer, the combination with the conveyer supports, of the conveyers traveling longitudinally thereon and projecting on both sides of said supports whereby a single conveyer forms the adjacent sides of adjacent runs for the fruit or vegetable; substantially as described.

20. In a fruit and vegetable sizer, the combination with the main frame having the supporting legs and pockets for the fruit, of the traveling conveyers passing over said pockets and the pulleys over which said conveyers pass journaled in supports extending beyond the ends of the main frame; substantially as described.

JOSEPH H. SHIREMAN.

Witnesses:
ALEX. S. STEUART,
THOMAS DURANT.